May 22, 1934.  F. C. BIGGERT, JR., ET AL  1,959,852
FLYING CUTTER
Filed Oct. 25, 1929  3 Sheets-Sheet 1

WITNESSES
AB Wallace
Charles J. Cope

INVENTOR
Florence C. Biggert Jr.
and John A. Smitmans
By Brown & Critchlow
attys.

May 22, 1934.  F. C. BIGGERT, JR., ET AL  1,959,852
FLYING CUTTER
Filed Oct. 25, 1929  3 Sheets-Sheet 2
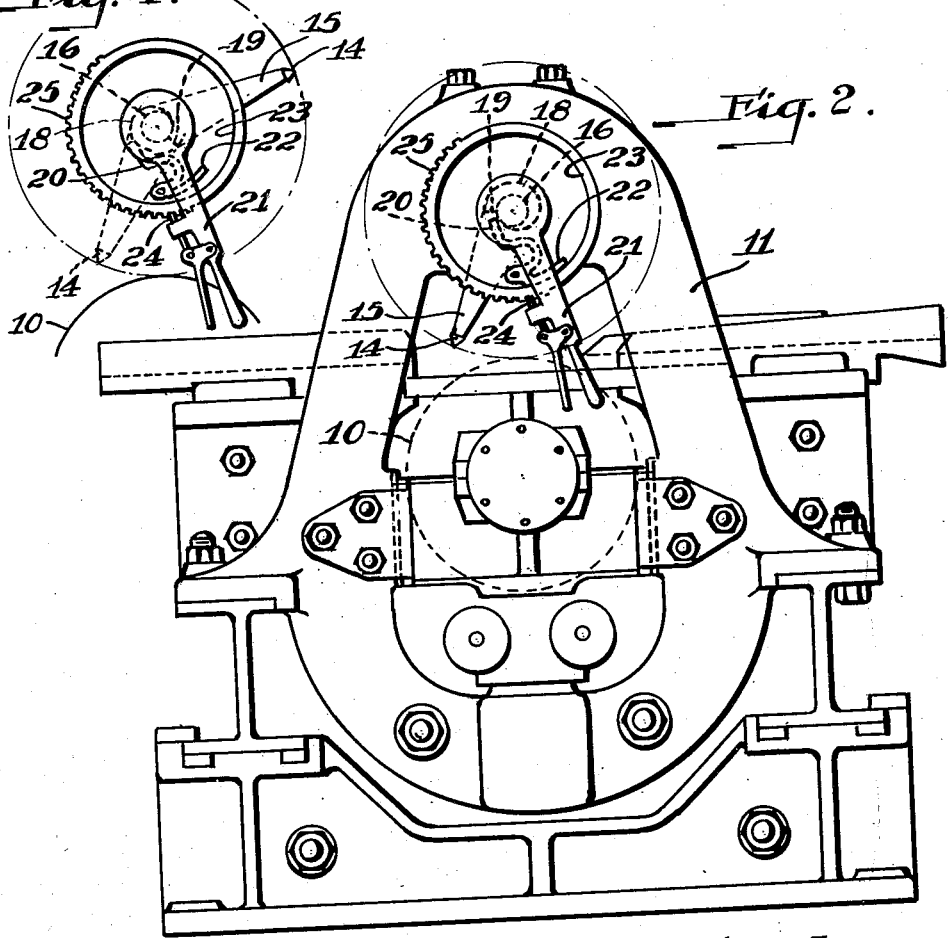
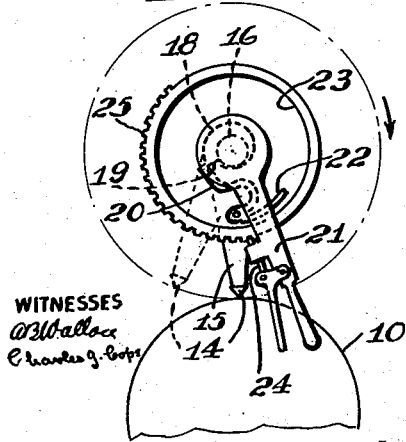
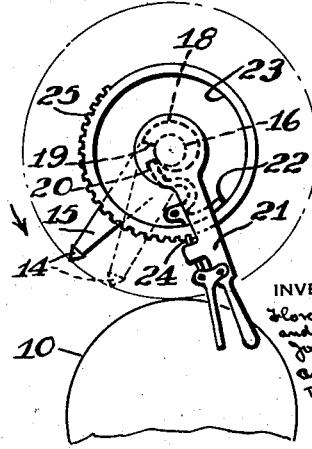

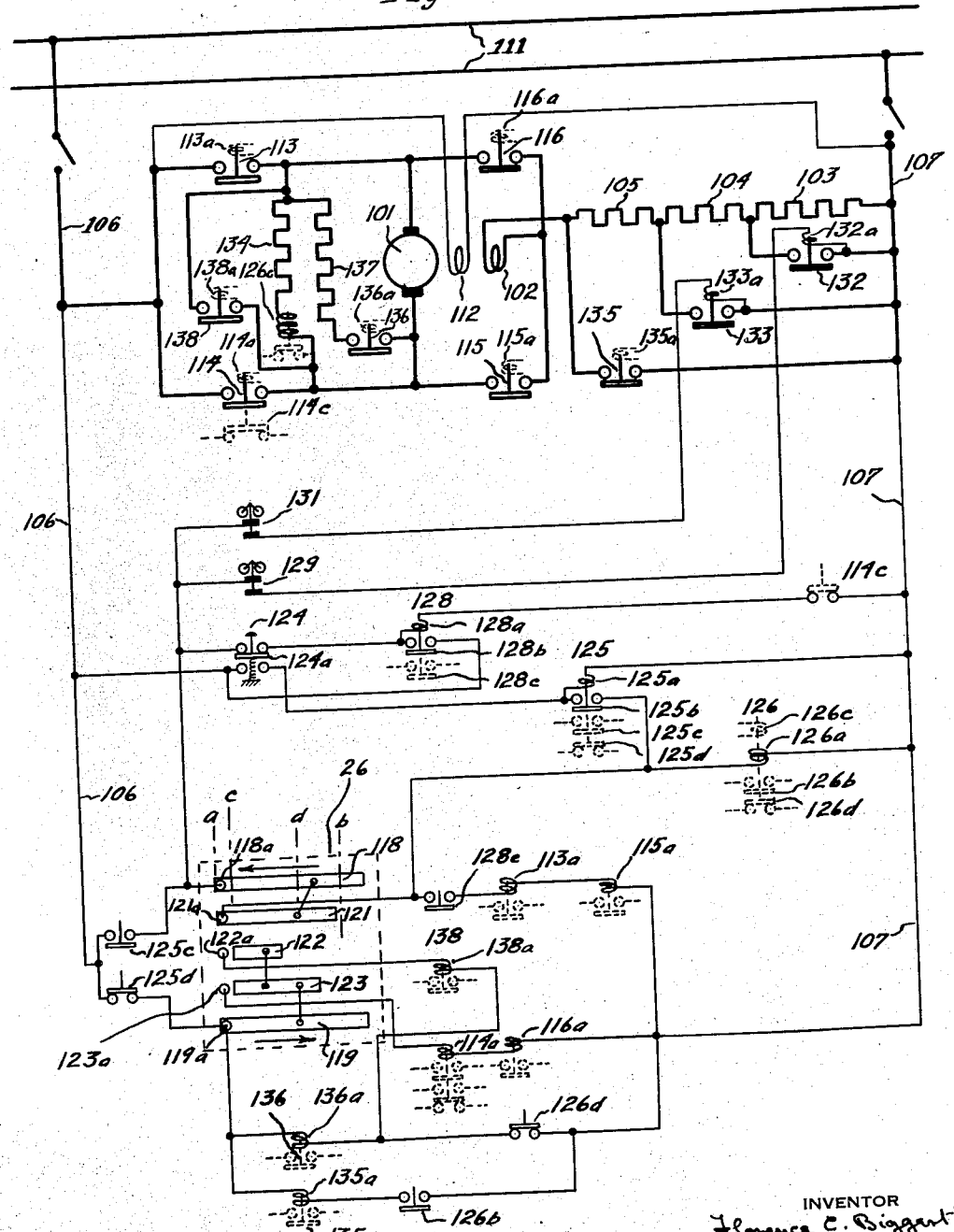

Patented May 22, 1934

1,959,852

UNITED STATES PATENT OFFICE 1,959,852

FLYING CUTTER

Florence C. Biggert, Jr., Crafton, and John A. Smitmans, Pittsburgh, Pa., assignors to United Engineering & Foundry Company, Pittsburgh, Pa., a corporation of Pennsylvania Application October 25, 1929, Serial No. 402,382

25 Claims. (Cl. 164—66)

Our invention pertains to flying cutters for severing moving material, such, for instance, as metal strip or the like coming from a rolling mill.

Where, as has heretofore been proposed, the material is cut by means of a blade disposed transversely to the material and rotated at a peripheral speed substantially the same as the linear speed of the material, the lengths into which the material is cut are necessarily multiples of the periphery of the circle described by the blade, which imports a limitation on the closeness of the measurements to which the material can be cut. It is an object of our invention to obviate such limitation, and to provide a flying cutter capable of cutting the material into any desired lengths, and of operating on such material, during its movement, at any desired point. A further object of our invention is to provide a flying cutter, of the character in which the blade is put into effective operation whenever a cut is desired to be made, which is exceptionally adapted for operating on material moving at very high speeds, such as those encountered in strip rolling mills. And other objects will appear from the following specification and claims.

As an example of an embodiment of our invention, a flying cutter constructed in accordance therewith is described in the following specification and shown in the accompanying drawings, in which:

Fig. 2 is a side elevation of the same, the cutting blade being shown in the stationary position it occupies when not in operation;

Fig. 3 is a diagrammatic side view, showing the blade, in full lines, in its cutting position, the stationary position of the blade being shown in dotted lines;

Fig. 4 is a similar view showing the blade at a position such as it assumes when about to reverse its direction of movement to return towards its normal stationary position;

Figure 1:
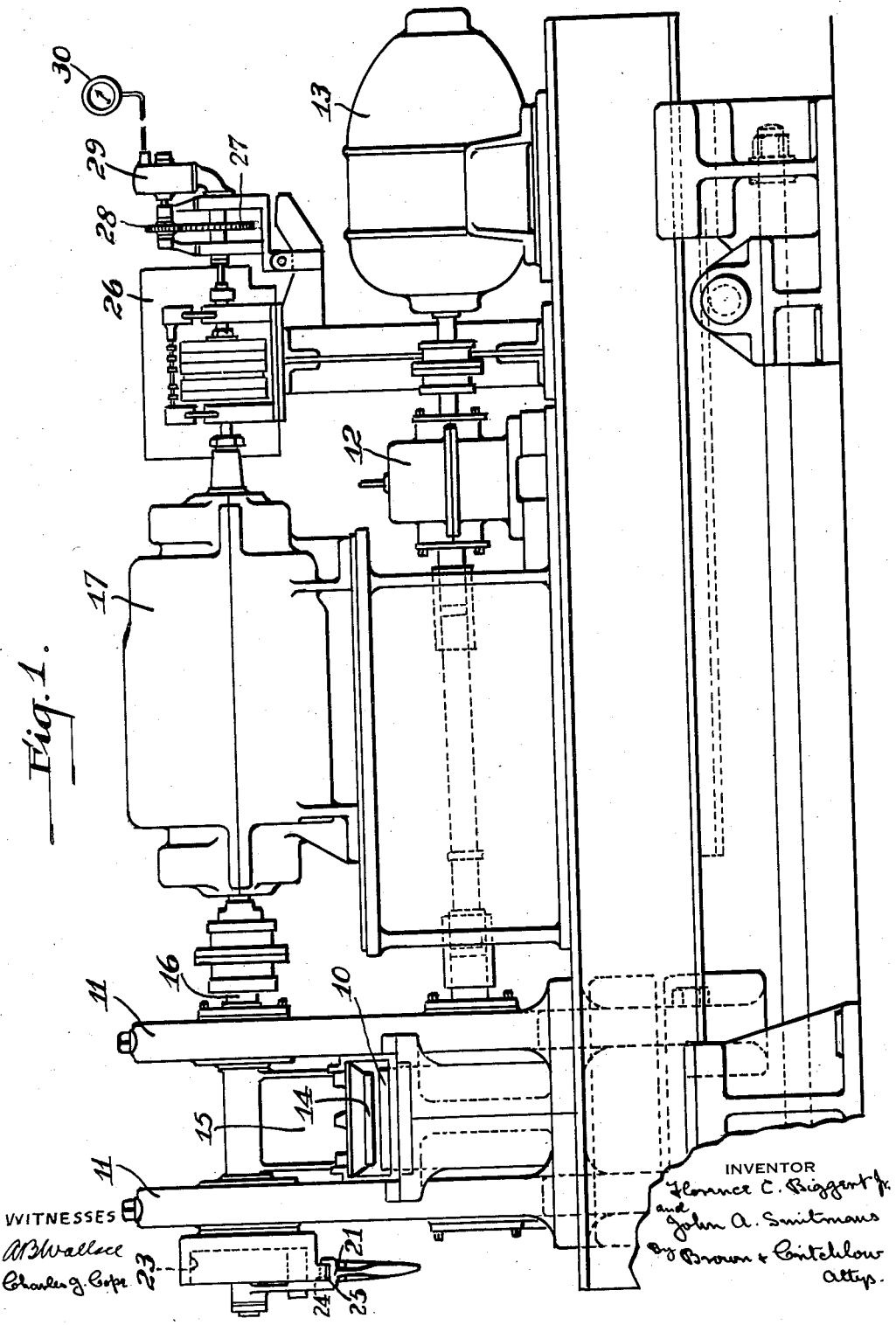
Fig. 1 is an end view of the cutter as seen in the direction of movement of the material, in this instance strip issuing from a rolling mill.

Fig. 5 is a similar view showing the blade during its return movement, when it is approaching its normal stationary position; and Fig. 6 is a schematic wiring diagram showing one electrical system which may be employed for controlling the operation of a blade-actuating electric motor for obtaining the desired movement of the blade, the circuit, and the control apparatus therein, being shown in its normal de-energized condition.

Referring now to the drawings, the particular form of flying cutter selected for illustration and shown therein is intended for cutting strip as it issues from a rolling mill, and comprises an anvil roll 10 rotatably mounted in bearings carried by a stand 11 and driven, through suitable reduction gearing 12, at a peripheral speed which is substantially the same as the linear speed of the strip, by means of an electric motor 13, hereinafter referred to as the "anvil motor". It will be appreciated that the linear speed of the strip, generally referred to as the "mill speed", will vary with different jobs. Accordingly, means of a well known character are provided for running the anvil motor 13 at varying speeds, to accord with the mill speed which may obtain at that particular time.

For cutting the strip when desired a blade 14 is provided, adapted to work against the anvil roll 10 and make cutting engagement with the strip as the latter passes above such anvil roll. The blade is mounted in a blade holder 15 which is secured to a shaft 16 rotatably mounted in bearings carried by the stand 11. The shaft 16 is adapted to be rotated in a clockwise direction, as seen in the side views (it being understood that the strip enters the device from the right), by an electric motor 17, hereinafter referred to as the "blade motor". The blade is thus rotated, from the stationary position shown in Fig. 2, through more than a complete revolution, during which movement it makes the cut, and is then caused to rotate in a reverse direction until it regains its original stationary position.

To determine the normal stationary position of the blade, the following means are employed in the particular device shown: The base of the blade holder 15, or other suitable member on the shaft 16, is formed to produce a snail cam 18, at the ends of which is a shoulder 19. This shoulder is adapted to engage, in a counter-clockwise direction, the end of a dog 20 which is pivoted to a lever 21 and is provided with a tail-piece 22 adapted to engage the inner surface of a collar 23 which is fixedly mounted on the stand 11, concentric with the blade holder shaft 16. The lever 21 is provided with a manually operable latch 24 adapted to engage in one or another of a series of teeth 25 formed on the outer periphery of the collar 23, so that the position of the lever, and consequently of the dog 20 pivoted thereto, may be adjusted as desired. It will be noted that the dog 20 supports the blade holder 15 in the desired stationary position, such as that shown in Fig. 2, permitting the free passage of the strip between it and the anvil roll, but that the blade holder nevertheless can rotate in a clockwise direction, the dog 20 then riding up the snail cam 18 and snapping over the end of the latter when a rotation has been completed.

A limit switch 26, which may be of the well known drum type, is connected to rotate with the blade holder shaft 16, and effects the starting and certain of the other manipulations of the blade motor 17. When the strip is to be cut, an electrical contact is made, either manually, or automatically, to cause current to be supplied to the blade motor to cause the latter to rotate in a forward direction. The blade motor, and the resistances etc. in its circuits, is so constituted that by the time the blade has rotated from its stationary position, shown in Fig. 2, to its cutting position shown in Fig. 3 it will have been accelerated to just that extent that the peripheral speed of its edge will be substantially the same as the linear speed of the material. That this condition may continue to obtain, in spite of the fact that the mill speed may vary, we provide control means between the anvil motor 13 and the blade motor 17 so that the speed of the blade motor, at least during the forward accelerating portion of its cycle of operation, will be dependent upon the speed of the anvil motor and consequently upon the mill speed.

It will be observed that the peripheral speed to which the blade 14 is accelerated will be dependent upon the length of the circular path through which it moves to reach the cutting position; so that the peripheral speed of the blade, at the cutting instant, can be controlled by modifying the original stationary position of the blade. This can be effected by shifting the dog 20, through an adjustment of the lever 21.

Substantially when the cut occurs, the limit switch 26 operates to break the circuit supplying current to the blade motor 17, and, slightly later, operates to establish a circuit supplying current to such motor in a reverse direction. However, owing to the momentum of the blade and blade-holder, the motor armature, etc., these parts continue to rotate in a clockwise direction, against the braking effect of the reversed motor current, until they are brought to rest in some such location as is indicated by the position of the blade holder shown in Fig. 4. When the blade motor and blade holder thus come to rest, resistance is introduced into the reversed motor circuit, to prevent too much speed in the return movement of the blade holder, and the parts rotate in a counter-clockwise direction until some such position of the blade 14 is reached as is indicated in Fig. 5, whereupon the motor circuit is broken. Thereafter, by reason of the weight of the bladeholder 15 and associated members, the parts settle in a counter-clockwise direction until the shoulder 19 again rests on the dog 20. The parts are then in position for another cut.

In order to indicate adjustments which may be desirable in operation, such as an adjustment of the position of the dog 20, we provide means by which the peripheral speed of the blade, at the cutting instant, may be read. If such peripheral speed does not accord with the mill speed, the dog 20, for instance, may be adjusted to cure the defect. One such means conveniently consists of a fly wheel 27, having a driving connection with the blade holder shaft 16 so as to rotate with the latter, such fly wheel having a ratchet connection with its shaft, so as to be driven in one direction only. Thus the fly wheel 27 will be accelerated up to the highest speed of the blade holder (which is reached at substantially the cutting instant), and will thereafter rotate at substantially such speed for a short time, sufficient to enable a reading to be taken, of its own momentum. The fly wheel 27 may take the form of a gear with which meshes a pinion 28 on the shaft of a magneto 29 furnished with an indicator 30. From this indicator the peripheral speed of the blade, at the cutting instant, can be read and any desirable adjustments accordingly made.

In Fig. 6 of the drawings we have illustrated one form of system capable of controlling the operation of the blade motor in the manner above referred to. In this system the armature 101 of the motor is connected, in series relation with its series field winding 102 and a plurality of resistor sections 103, 104 and 105, across lines 106 and 107 which are in turn connected to a source of current supply 111. In parallel relation with this circuit is another circuit including a shunt field winding 112 for the motor.

For establishing the circuit of the armature 101, and controlling the direction of flow of current therethrough so that the motor may be actuated in either direction, a pair of forward switches 113 and 115, and a pair of reverse switches 114 and 116 are provided. To provide automatically for controlling the operation of these and other switches in the system, a drum limit switch 26 is employed, and, as referred to hereinbefore, is operably coupled for rotation with the motor. Such limit switch comprises a pair of continuous supply bands 118 and 119 and three shorter bands 121, 122 and 123, of which the bands 118 and 121 are connected together, as also are the bands 119, 122 and 123. A line of brushes 118a, 119a, 121a, 122a, and 123a are adapted to make contact with the correspondingly numbered bands, the relative positions of the bands and brushes, in the normal deenergized condition of the system, being indicated by the line a in the diagram, in which the bands are shown in development.

A push button 124, normally occupying the upper position shown in the diagram, is shown as the means for starting the operation of the system. The contact 124a of this button, when depressed, establishes a circuit extending from line 106 through the actuating coil 125a of a low voltage relay 125 to line 107. The low voltage relay has a holding contact 125b, adapted to establish a holding circuit through the coil 125a after the relay has once been actuated. a contact 125c, adapted to establish connection between the line 106 and supply band 118, through the brush 118a, when the relay is actuated, and a back contact 125d adapted to establish connection between the line 106 and the supply band 119, through the brush 119a, when the relay is released. Thus when the low voltage relay 125 is actuated, upon the push button 124 being depressed, the brush 118a and supply band 118 are connected to the line 106, the brush 119a and supply band 119 are disconnected from the line 106, and a holding circuit is established which maintains the relay closed in spite of the subsequent release of the push button.

Upon the push button 124 being released after actuation, its contact 124a throws into operation a forward relay 128 which establishes a holding circuit for itself and also throws into operation the forward switches 113 and 115 to cause the blade motor to rotate in the forward direction.

The circuit for originally operating the forward relay 128 is from the brush 118a through the raised push-button contact 124a, forward relay actuating coil 128a and back contact 114c (to be hereinafter referred to) to the line 107. The holding circuit is from the line 106 through a holding contact 128b of the forward relay, the actuating coil of such relay and the back contact 114e to the line 107. The circuit for actuating the forward switches 113 and 115 is from the supply band 118 through the band 121, brush 121a, the contact 128c of the forward relay 128 and the actuating coils 113a and 115a, respectively, of the forward switches 113 and 115, to the line 107.

From the foregoing it will be seen that upon the push button 124 being depressed and subsequently released, the circuit for rotating the blade motor 101 will be established, and will be maintained until broken at a later period as hereinafter explained. The motor 101 rotates the blade-holder 15 towards cutting position, and accelerates such blade holder so that the blade reaches face speed with the strip by the time the cutting position is reached.

To provide for variation of the speed of the blade motor in accordance with variations of the mill speed, so that the acceleration of the blade up to face speed with the strip may be maintained in spite of such changes in the mill speed, we provide means, controlled by the speed of the strip, for cutting in or out sections of a resistance connected in series with the motor. To this end, two (though more may be employed if it be desired that the control be more delicate) speed controlled switches 129 and 131, are connected, in parallel relation, between the brush 118a and the line 107. These switches have in their circuits the actuating coils 132a and 133a of switches 132 and 133, adapted, when closed, to establish shunt circuits around the resistor section 103 and the resistor sections 103 and 104, respectively, these resistor sections being connected in series with the motor. The switches 129 and 131 may be governor controlled, as indicated, or may be controlled by current conditions existing in other electrical circuits employed in the use of the cutter,—as, for instance, in the field circuit of the anvil motor 13. They are responsive to the mill speed, and each to a different degree thereof. Suppose, for example, the mill speed is relatively low, the switches 129 and 131 will remain open, leaving the resistor sections 103 and 104 effective. When the mill speed is increased somewhat, the switch 129 will close, shunting the resistor section 103 and consequently speeding up the motor 101. When the mill speed is increased further, the switch 131 will close, shunting the resistor sections 103 and 104 and further increasing the speed of the motor 101.

By the time the blade has reached the cutting position, the limit switch will have moved, in the direction of the arrow shown at the top thereof in Fig. 6, to such a position that the line of contact of the bands with the brushes will be at b. When this position is reached, the end of the band 121 passes from beneath the brush 121a, thereby breaking the holding circuits of the forward switches 113 and 115, allowing these to open, and also breaking the holding circuit of the low voltage relay 125, allowing its contact 125c to open, and its back contact 125d to close.

After the forward switches 113 and 115 have thus been opened, and the motor circuit thereby broken, the motor and blade-holder continue to rotate, of their momentum, until they and the limit switch have slightly passed their original position and have reached a position, in the second rotation, where the relation of the bands to the brushes is as indicated by the broken line c. At this point, the band 123 comes into contact with its brush 123a, between which latter and the line 107 the actuating coils 114a and 116a of the reverse switches 114 and 116 are connected. Thus a circuit is established from line 106 through the back contact 125d (now closed) of the low voltage relay, brush 119a, supply band 119, band 123, brush 123a and actuating coils 114a and 116a, to line 107. Thereby the reverse switches 114 and 116 are closed and current is applied to the motor in a reversed direction. So that a full plugging current may be applied to the motor at this time, a shunt circuit is provided around the whole resistor comprised by the sections 103, 104 and 105, such shunt circuit having therein a normally open switch 135. The actuating coil 135a of such switch is connected, through a contact 126b of another switch 126, to be hereinafter referred to, between the brush 119a and the line 107; so that when the back contact 125d of the low voltage relay is closed and the contact 126b is closed (as the latter is at this period in the cycle), the actuating coil 135a will be energized and the shunt circuit established around the resistor sections 103, 104 and 105. A powerful plugging current is thus applied to the motor, having the effect of braking the rotating parts and finally bringing them to rest at a position of the blade holder which may be as shown in Fig. 4, the relative positions of the bands and brushes of the limit switch being then as indicated by the broken line d in Fig. 6.

After the motor has come to rest the reversed current starts it backward, to return the blade to its starting position, the drum switch then rotating in the direction indicated by the arrow at the bottom of the limit switch (Fig. 6). That the motor may not operate too rapidly in starting this reverse movement, the resistor sections 103, 104 and 105 are cut in again substantially at the instant of physical reversal, and a shunt circuit, including a suitable resistor 137, is established across the motor armature. These results are effected by a switch 126 having an actuating coil 126a and a holding coil 126c. The actuating coil 126a is in circuit relation with the contact 125c of the low voltage relay, and thus is energized, to raise the switch, when such relay is first operated. The holding coil 126c, with a suitable resistance 134, is connected in shunt with the motor armature. Thus after the actuating coil 126a has been deenergized, due to the opening of the low voltage relay at the time the cut is made, the holding coil 126c remains still energized by the counter-electromotive force of the armature, so that the switch 126 continues to be held in its raised position, with its contact 126b closed and its back contact 126d open. At about the point of physical reversal of the motor, however, the counter-electromotive force of the armature having dropped, the holding coil 126c loses sufficient strength to sustain the switch 126, which thereupon drops, opening its contact 126b and closing its back contact 126d. Opening the contact 126b breaks the circuit in which is the actuating coil 135a of the switch 135; so that the switch 135 opens, cutting in again to the motor circuit the resistor sections 103, 104 and 105. Closing the back contact 126d completes a circuit in which is the actuating coil 136a of a switch 150

136, which, when actuated, establishes a shunt circuit, including a resistor 137, around the motor armature 101. Thus, during the first part of the return movement, when the blade-holder 15 is being rocked back, for instance, past its upper dead center, the motor is operated slowly, but with sufficient power to effect the desired movement of the blade holder.

When the motor has made the initial part of its return movement, the armature 101 is short circuited, so as to brake the return movement of the blade-holder, in which movement gravity now takes part. Such short circuiting of the armature occurs upon the right hand end of the band 122 reaching the brush 122a, whereupon a circuit is established through the actuating coil 138a of a switch 138 which, when actuated, establishes a short circuit around the armature 101.

Just before the blade-holder reaches its initial position, the left hand end of the band 123 leaves the brush 123a, thereby deenergizing the reverse switches 114 and 116 and bringing all circuits back to the normal deenergized condition shown in Fig. 6.

It will be noted the flying cutter of our invention is capable of cutting the material at any desired point, entirely independent of the circle which is described by the blade edge. Thus the material may be cut into lengths of any desired nicety of dimension. All that is necessary is to close the blade-motor circuit-making contact at such a time that the blade will reach the material at the point where it is desired that the cut shall be made. Moreover, the cutter is well adapted for operation on material moving at a high rate of speed such as frequently obtains in rolling mill practice, particularly where, as in the above-described form of the device, the blade has the greater part of an entire revolution in which to pick up to the linear speed of the material, and over a half revolution in which to be slowed down and stopped. Because of the control of the blade motor so that its speed of operation, in rotating the blade to effect the cut, is dependent on the speed of the anvil motor, and thus corresponds with the mill speed, the cutter automatically adapts itself to different mill speeds.

Whilst we have described and shown one form of flying cutter in which our invention may be embodied, it is to be understood that the invention may be embodied in other forms, and that changes may be made in the form described and shown, without exceeding the scope thereof, as defined in the appended claims.

We claim:

1. A flying cutter for operating on moving material, comprising a normally stationary blade mounted for rotary movement and adapted to make cutting engagement with the material at a point in such movement, a movable member, an electric motor for moving said member at face speed with the material, an electric motor adapted when energized to impart rotary movement to said blade, the stationary position occupied by said blade being such that said blade reaches at the cutting point a peripheral speed substantially equal to the linear speed of the material, and electrical means for coordinating the speed of said second-named with that of said first-named motor.

2. A flying cutter for operating on moving material, comprising a normally stationary blade mounted for rotary movement and adapted to make cutting engagement with the material at a point in such movement, a member moving at face speed with the material, accelerating means for imparting rotary movement to said blade, means for controlling the speed of said accelerating means in accordance with the speed of said member, and means for adjusting the stationary position occupied by said blade so that the latter reaches at the cutting point a speed substantially equal to the linear speed of the material.

3. A flying cutter for operating on moving material, comprising a normally stationary blade mounted for rotary movement and adapted to make cutting engagement with the material at a point in such movement, a movable member, an electric motor for moving said member at face speed with the material, an electric motor adapted when energized to impart rotary movement to said blade, means for adjusting the stationary position occupied by said blade so that the latter reaches at the cutting point a speed substantially equal to the linear speed of the material, and electrical means for coordinating the speed of said second-named with that of said first-named motor.

4. A flying cutter for operating on moving material, comprising a blade mounted for rotary movement and adapted to make cutting engagement with the material at a point in such movement, means for imparting rotary movement to said blade, said means being constituted to accelerate said blade to a peripheral speed substantially equal at the cutting point to the linear speed of the material, means for braking said blade after the cut has been made, and means for turning said blade in a reverse direction to return it towards its stationary position.

5. A flying cutter for operating on moving material, comprising a normally stationary blade mounted for rotary movement and adapted to make cutting engagement with the material at a point in such movement, an electric motor adapted when energized to impart rotary movement to said blade, the stationary position occupied by said blade being such that said blade reaches at the cutting point a peripheral speed substantially equal to the linear speed of the material, means for reversing the current in said motor after the cut has been made, thereby to brake said blade, and means for reducing such reversed current substantially on stoppage of said blade, whereby said motor returns said blade relatively slowly towards its stationary position.

6. A flying cutter for operating on moving material comprising a stop member, a blade mounted for rotary movement and adapted to make cutting engagement with the material at a point in such movement, a stop member associated with said blade and adapted for engagement with said first-named stop member to maintain said blade in a stationary position, said stop members being constructed to permit passage of one past the other in the operating direction of movement of said blade, means for imparting an accelerating rotary movement to said blade, and means for stopping such movement after a rotation of said blade has been completed.

7. A flying cutter for operating on moving material comprising a stop member, a blade mounted for rotary movement and adapted to make cutting engagement with the material at a point in such movement, a stop member associated with said blade and adapted for engagement with said first-named stop member to maintain said blade in a stationary position, said stop members being constructed to permit passage of one past the other in the operating direction of movement of said blade, means for imparting an accelerating rotary movement to said blade, means for stopping such movement after a rotation of said blade has been completed, and means for returning said blade to stationary position in which said stop members engage.

8. A flying cutter for operating on moving material comprising a stop member, a blade mounted for rotary movement and adapted to make cutting engagement with the material at a point in such movement, a stop member associated with said blade and adapted for engagement with said first-named stop member to maintain said blade in a stationary position, said stop members being constructed to permit passage of one past the other in the operating direction of movement of said blade and one of said members being adjustable to vary the stationary position of said blade, means for imparting an accelerating rotary movement to said blade, and means for stopping such movement after a rotation of said blade has been completed.

9. A flying cutter for operating on moving material comprising a stop member, a blade mounted for rotary movement and adapted to make cutting engagement with the material at a point in such movement, a stop member associated with said blade and adapted for engagement with said first-named stop member to maintain said blade in a stationary position, said stop members being constructed to permit passage of one past the other in the operating direction of movement of said blade, means for imparting an accelerating rotary movement to said blade, and means for discontinuing the driving action of said last-named means substantially when the cut is made, thereby permitting the blade to complete a rotation by momentum.

10. A flying cutter for operating on moving material comprising a stop member, a blade mounted for rotary movement and adapted to make cutting engagement with the material at a point in such movement, a stop member associated with said blade and adapted for engagement with said first-named stop member to maintain said blade in a stationary position, said stop members being constructed to permit passage of one past the other in the operating direction of movement of said blade, an electric motor for imparting a rotary movement to said blade when forwardly driven, and a switch device for discontinuing forward driving of said motor substantially when the cut is made, thereby permitting the blade to complete a rotation by momentum.

11. A flying cutter for operating on moving material comprising a stop member, a blade mounted for rotary movement and adapted to make cutting engagement with the material at a point in such movement, a stop member associated with said blade and adapted for engagement with said first-named stop member to maintain said blade in a stationary position, said stop members being constructed to permit passage of one past the other in the operating direction of movement of said blade, means for imparting an accelerating rotary movement to said blade, means for discontinuing the driving action of said last-named means substantially when the cut is made, thereby permitting the blade to complete a rotation by momentum, and means for braking said blade after the cut has been made.

12. A flying cutter for operating on moving material comprising a stop member, a blade mounted for rotary movement and adapted to make cutting engagement with the material at a point in such movement, a stop member associated with said blade and adapted for engagement with said first-named stop member to maintain said blade in a stationary position, said stop members being constructed to permit passage of one past the other in the operating direction of movement of said blade, an electric motor for imparting a rotary movement to said blade, and a switch device for reversing the current in said motor substantially when the cut is made, thereby to brake said blade during its further movement by momentum.

13. A flying cutter for operating on moving material comprising a stop member, a blade mounted for rotary movement and adapted to make cutting engagement with the material at a point in such movement, a stop member associated with said blade and adapted for engagement with said first-named stop member to maintain said blade in a stationary position, said stop members being constructed to permit passage of one past the other in the operating direction of movement of said blade, an electric motor for imparting a rotary movement to said blade, and a switch device for reversing the current in said motor after the cut is made, thereby to brake said blade during its further movement by momentum, said switch device being timed further to cause said motor to return said blade towards stationary position in which said stop-members engage.

14. A flying cutter for operating on moving material comprising a stop member, a blade mounted for rotary movement and adapted to make cutting engagement with the material at a point in such movement, a stop member associated with said blade and adapted for engagement with said first-named stop member to maintain said blade in a stationary position, said stop members being constructed to permit passage of one past the other in the operating direction of movement of said blade, an electric motor for imparting a rotary movement to said blade, a switch device for reversing the current in said motor substantially when the cut is made, thereby to brake said blade during its further movement by momentum, said switch device being timed further to cause said motor to return said blade towards stationary position in which said stop-members engage, and means for introducing a resistance into the circuit of said motor during the return of said blade.

15. A flying cutter for operating on moving material, comprising an anvil roll, a cooperating cutting blade arranged in axial alignment with said roll and mounted for rotation about an axis parallel thereto, means for rotating the anvil roll continuously, and means for starting the cutting blade from rest and bringing it up to the peripheral speed of the anvil roll by the time it is rotated into cutting relation therewith and then bringing it to rest again after it has passed said roll sufficiently far to permit the material to pass between the roll and blade without interference from the blade.

16. A flying cutter for operating on moving material, comprising an anvil roll, a cooperating cutting blade arranged in axial alignment with said roll and mounted for rotation about an axis parallel thereto, means for rotating the anvil roll continuously, means for starting the cutting blade from rest and bringing it up to the peripheral speed of the anvil roll by the time it is rotated into cutting relation therewith and then bringing it to rest after it has passed said roll, and adjustable means for determining the point said blade is brought to rest after it passes the roll to determine the angular distance between the starting and cutting point of said blade to allow for bringing the blade to different peripheral speeds by the time it is opposite the anvil roll.

17. A flying cutter for moving material, comprising an anvil roll, a cooperating cutting blade arranged in axial alignment with said roll and mounted for rotation about an axis parallel thereto, means for rotating the anvil roll continuously, an electric motor for rotating said cutting blade, said motor being adapted to start said blade from rest and bring it up to the peripheral speed of the anvil roll by the time it is in cutting relation therewith, and means for stopping the blade after it has passed the anvil roll far enough that it will not interfere with the material passing between it and the anvil roll.

18. A flying cutter for moving material, comprising an anvil roll, a cooperating cutting blade arranged in axial alignment with said roll and mounted for rotation about an axis parallel thereto, means for rotating the anvil roll continuously, an electric motor for rotating said cutting blade, said motor being adapted to start said blade from rest and bring it up to the peripheral speed of the anvil roll by the time it is rotated into cutting relation therewith, means operable at will for starting said blade-operating motor, and means automatically operable for reversing said motor and arresting the movement of the cutting blade after it has passed out of cutting relation with the anvil roll.

19. A flying cutter for operating on moving material, comprising a blade mounted for movement in a cycle and adapted to make cutting engagement with the material at a point in such cycle, rotating means for actuating said blade to cause said blade to complete a cycle in each rotation of said means, means for actuating said rotating means, said last-named means being constituted to actuate said rotating means to accelerate said blade to a peripheral speed substantially equal at the cutting point to the linear speed of the material, and means for automatically modifying the speed of said second-named means to accord with varying speeds of linear movement of the material.

20. A flying cutter for operating on moving material, comprising a blade mounted for movement in a cycle and adapted to make cutting engagement with the material at a point in such cycle, rotating means for actuating said blade to cause said blade to complete a cycle in each rotation of said means, means for actuating said rotating means, said last-named means being constituted to actuate said rotating means to accelerate said blade to a peripheral speed substantially equal at the cutting point to the linear speed of the material, means for braking said rotating means after the cut has been made, and means for turning said rotating means in a reverse direction to return it towards its stationary position.

21. A flying cutter for operating on moving material comprising a cutter element, a normally stationary blade mounted for rotary movement and associated with said cutter element to cooperate therewith, to effect a cut, during each revolution, a motor connected with said blade for rotating the latter and accelerating it to a peripheral speed substantially equal at the cutting point to the linear speed of the material, and means for stopping said blade at such point that the said acceleration thereof occupies more than one-half and less than one revolution of said blade.

22. A flying cutter for operating on moving material comprising a cutter element, a blade mounted for movement in a cycle and associated with said cutter element to cooperate therewith, to effect a cut, during each cycle, normally stationary rotatable means for actuating said blade to complete a cycle in each rotation thereof, a motor connected with said rotatable means for rotating the latter and accelerating it to bring said blade to a peripheral speed substantially equal at the cutting point to the linear speed of the material, and means for stopping said rotatable means at such point that said acceleration thereof occupies more than one-half and less than one revolution of said rotatable means.

23. In a flying cutter for cutting moving material, a rotatably mounted cutting blade adapted to produce a cut each time it is rotated, means for normally maintaining said blade in a selected position of rest, means for imparting rotary movement to said blade, said means being adapted to accelerate said blade from rest to a peripheral speed substantially equal at the cutting point to the linear speed of the material, and means for automatically modifying the speed of operation of said blade actuating means to accord with varying speeds of linear movement of the material.

24. An intermittently operable flying shear for cutting moving material, comprising, a cutter, a rotary anvil disposed to assist in feeding the material through the shear and cooperate with said cutter in the production of cuts transversely of the material, and means for moving said cutter from a position of rest over said anvil in the direction of travel of the material to produce a cut and back to a position of rest.

25. An intermittently operable flying shear for cutting moving material, comprising, a cutter, a rotary anvil disposed to assist in feeding the material through the shear and cooperate with said cutter in the production of cuts transversely of the material, and means for moving said cutter from a position of rest over said anvil in the direction of travel of the material to produce a cut and back to a position of rest, said means being adapted to cause the cutter to engage the material once in each operation and to travel at substantially the speed of the material when producing a cut.

FLORENCE C. BIGGERT, Jr.
JOHN A. SMITMANS.